US011951895B2

(12) United States Patent
Marchlewski et al.

(10) Patent No.: US 11,951,895 B2
(45) Date of Patent: Apr. 9, 2024

(54) PICK-UP TRUCK STAKE SUPPORT BRACKET

(71) Applicant: Ford Global Technologies, LLC, Dearborn, MI (US)

(72) Inventors: Jack Marchlewski, Saline, MI (US); Dragan B Stojkovic, Taylor, MI (US); Joshua Robert Hemphill, White Lake, MI (US); Robert Reiners, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 761 days.

(21) Appl. No.: 17/039,842

(22) Filed: Sep. 30, 2020

(65) Prior Publication Data

US 2022/0097589 A1 Mar. 31, 2022

(51) Int. Cl.
*B60P 1/64* (2006.01)
*B60P 7/08* (2006.01)
*B60P 7/135* (2006.01)
*B62D 33/02* (2006.01)

(52) U.S. Cl.
CPC .............. *B60P 1/64* (2013.01); *B60P 7/0807* (2013.01); *B60P 7/135* (2013.01); *B62D 33/0207* (2013.01)

(58) Field of Classification Search
CPC ........... B60P 1/64; B60P 7/0807; B60P 7/135; B62D 33/0207
See application file for complete search history.

(56) References Cited

U.S. PATENT DOCUMENTS

| 3,841,695 | A | 10/1974 | Woodward |
| 5,618,078 | A * | 4/1997 | Aberle ............... B62D 33/0207 248/539 |
| 6,378,819 | B1 * | 4/2002 | Johnson ................. B62D 49/02 248/539 |
| 9,919,641 | B2 | 3/2018 | Marchlewski et al. |
| 10,189,510 | B1 | 1/2019 | Higgins |
| 10,377,294 | B2 | 8/2019 | Lindquist |
| 11,572,696 | B1 * | 2/2023 | Kowalewski ....... E04F 11/1817 |
| D990,287 | S * | 6/2023 | Dedios-Shirley .............. D8/354 |
| 2017/0361756 | A1 * | 12/2017 | Marchlewski ....... B62D 33/023 |
| 2022/0289099 | A1 * | 9/2022 | Wach .................. B62D 33/0207 |

* cited by examiner

*Primary Examiner* — Corey N Skurdal
(74) *Attorney, Agent, or Firm* — Vichit Chea; Carlson, Gaskey & Olds, P.C.

(57) ABSTRACT

The present disclosure discloses a stake support bracket coupled to walls of a cargo bed of a vehicle such as a pick-up-bed truck for providing support to a stake of a standard size or a non-standard size. The stake support bracket includes a first panel, a second panel transverse to the first panel, and a third panel transverse to the second panel. The third panel includes a stake support opening. The stake support bracket further includes a first extension transverse to the third panel and extending away from the first panel and a second extension transverse to the first panel and extending away from the third panel. The stake support bracket provides support to the bottom and the sides of the stake and reduces probabilities of wobbling or pivoting of the stakes.

20 Claims, 12 Drawing Sheets

PICK-UP TRUCK STAKE SUPPORT BRACKET

BACKGROUND

Technical Field

The present disclosure is directed to stake-pocket bracket in a pick-up truck bed, which is configured to provide a secure receptacle or support for a stake or a post.

Description of the Related Art

The ability to transport freight, goods, merchandise, personal property, and other such cargo is a great benefit of vehicles, such as pick-up trucks, that include a cargo bed. To accommodate more cargo or stabilize oversized cargo during transportation, multiple stakes can be inserted into side panels of the bed. The stakes can support a load that rests above and in the bed of a truck, such as a camper, or the stakes can alone or in conjunction with other features restrain the load to prevent the cargo from shifting or falling off.

BRIEF SUMMARY

The present disclosure is directed to stake pocket support brackets for a bed of a pick-up truck. The support brackets are within sides or walls of the bed and aligned with openings from a top surface of each side of the bed of the truck. Each support bracket includes a top panel and a bottom panel. The top panel includes an opening sized and shaped to receive a stake. The bottom panel includes a solid surface to support a bottom of the stake. The stake support brackets provide support to the bottom and sides of the stake and can reduce wobbling or pivoting of the stakes.

The stake support bracket includes a side panel that is transverse to the top and bottom panel. In order to attach to interior walls of the side of the pick-up truck, the stake support bracket includes a plurality of extensions that extend from the top, bottom, and side panels. A variety of combinations of extensions are envisioned to accommodate different shapes and dimensions within the walls of the bed of the truck. In one embodiment, a first extension extends up and away from the top panel. A second panel extends from the side panel and a third panel extends from the bottom panel.

Within each stake pocket there are a plurality of walls, a first wall is an internal wall of the bed, a second wall is an external wall of the bed, and a third sidewall of the bed that extends between the internal and external wall. In one embodiment, the support bracket includes a first, lower panel that extends between the internal wall and the external wall of the side of the pick-up bed. The first panel is configured to support a bottom surface of the stake when in the bed wall. The support bracket includes a second, side panel that is transverse to the first panel and a third, upper panel that is transverse to the second panel. The third panel extends between the internal wall and the external wall of the side of the pick-up bed and includes a stake support opening. A first extension extends from the third panel and is coupled to the sidewall. A second extension extends from the first panel and is coupled to the internal wall. A third extension may be coupled to the exterior wall. Other extension may also be coupled to ones of the interior wall, the exterior wall, and the sidewall.

A device includes a stake support bracket. The stake support bracket includes a first panel, a second panel transverse to the first panel, a third panel transverse to the second panel, the third panel including a stake support opening, a first extension transverse to the third panel and extending away from the first panel, and a second extension transverse to the first panel and extending away from the third panel.

The first panel includes an opening that is smaller than the stake support opening.

The stake support bracket further includes a third extension transverse to the third panel and extending away from the first panel, the third extension extends transverse to the first extension.

The stake support bracket further includes a fourth extension transverse to the second panel.

The stake support bracket includes a space between the first and third panels in a location opposite to the second panel.

The third panel has a larger area than the first panel, the stake support bracket includes a third extension transverse to the third panel and extending away from the first panel, the stake support opening being between the third extension and the second panel.

The stake support bracket includes a fourth extension transverse to the third panel and extending away from the first panel.

The third panel includes an edge that extends between the third extension and the first extension, the edge having a first dimension in a first direction, the first extension having a second dimension in the first direction, the first dimension being less than the second dimension.

The stake support bracket includes a fourth panel that is opposite to the second panel and is transverse to the first panel.

The stake support bracket includes a fifth extension that is transverse to the fourth panel and is adjacent to a portion of the third panel.

The third panel includes an internal edge that extends from the stake support opening toward the first panel.

A vehicle includes a pick-up bed that includes a plurality of sides. Each side includes an internal wall, an external wall, and a sidewall between the internal and external wall, a support bracket positioned within one of the plurality of sides of the pick-up bed. The support bracket includes a first panel that is between the internal and external wall of the side of the pick-up bed, a second panel transverse to the first panel, a third panel transverse to the second panel. The third panel includes a stake support opening, a first extension transverse to the third panel and coupled to the sidewall, and a second extension transverse to the first panel and coupled to the internal wall.

The support bracket includes a third extension that is coupled to the internal wall and a fourth extension is coupled to the sidewall.

The third panel has a larger area than the first panel. A third extension that extends from the third panel, the third extension is spaced from the second panel by the stake support opening; and a fourth extension that extends from the third panel.

The fourth extension is coupled to the sidewall.

The second panel is spaced from the external wall by a distance.

The support bracket is an integrally formed metal bracket.

A vehicle includes a bed, an interior wall of the bed, an exterior wall of the bed, a sidewall that extends between the interior wall and the exterior wall, a top wall that extends between the interior wall and the exterior wall, a first opening in the top wall, and a support bracket between the interior wall and the exterior wall. The support bracket includes a top panel that includes a second opening that is aligned with the first opening, a bottom panel that is spaced from the top panel, a first side panel that is coupled between the top and bottom panel, a first extension coupled to the interior wall, and a second extension coupled to the sidewall.

The first extension extends transverse from the top panel and the second extension extends transverse from the bottom panel.

The bottom panel includes a solid surface.

The support bracket further includes a third extension that extends transverse to the bottom panel and is coupled to the sidewall and a fourth extension that extends transverse to the top panel.

The first extension extends from a first side of the top panel, the second extension extends from a second side of the top panel, the fourth extension extends from a third side of the top panel that is transverse to the first side.

DETAILED DESCRIPTION

In the following description, certain specific details are outlined in order to provide a thorough understanding of various disclosed embodiments. However, one skilled in the relevant art will recognize that embodiments may be practiced without one or more of these specific details, or with other methods, components, materials, etc. In other instances, well-known structures or methods associated with vehicles have not been shown or described in detail to avoid unnecessarily obscuring descriptions of the embodiments.

Figure 1:
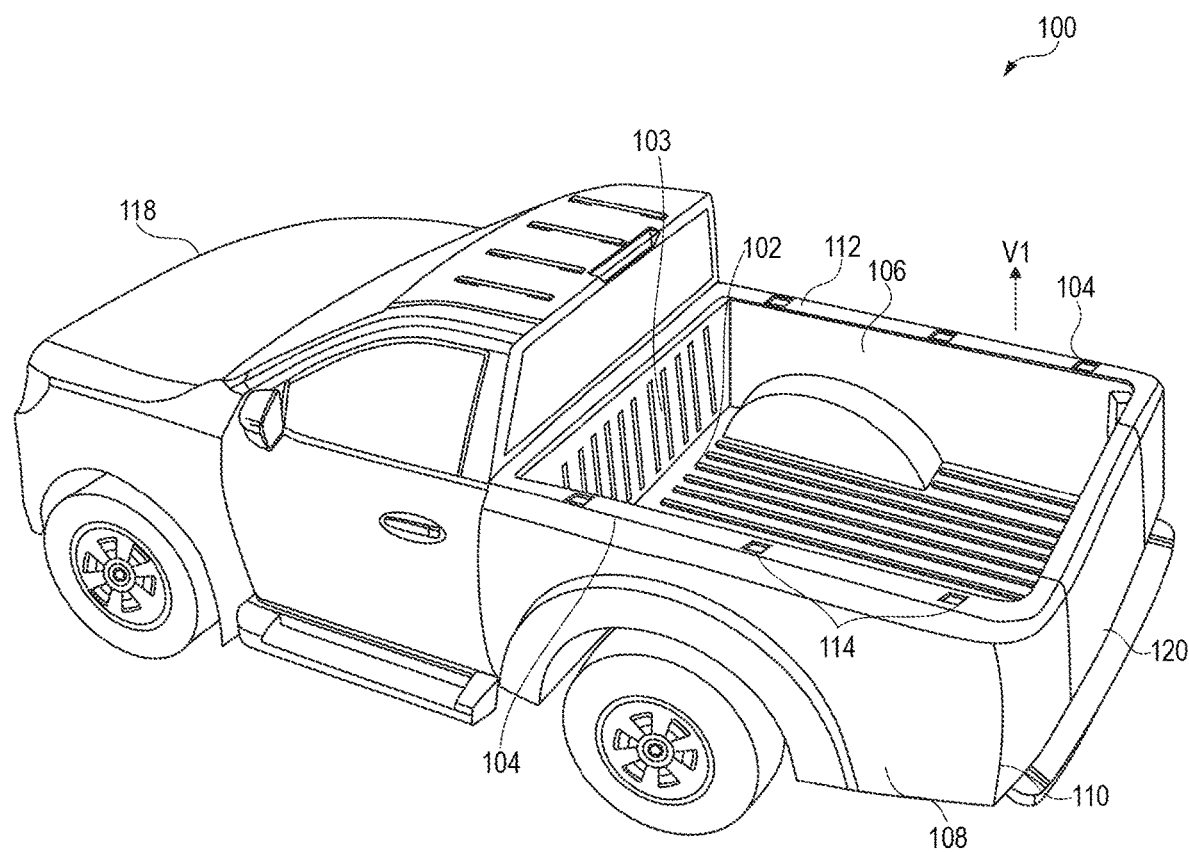
FIG. 1 is a rear perspective view of a pick-up truck.

The present disclosure is directed to a variety of stake pocket support brackets to be integrated within walls or sides 104 of a pick-up truck 100. FIG. 1 is a rear perspective view of the truck 100 including a bed 102. The left and right sides 104 extend away from the bed and are spaced from each other by a tailgate 120 and a cab-side panel 103.

Each side 104 includes a first, interior wall 106 that faces internally to the bed, and a second, external wall 108. The internal wall 106 is substantially parallel to the external wall 108, and the internal wall 106 and the external wall 108 are transverse to the bed 102. Once assembled, there is a cavity between the internal wall 106 and the external wall 108, as can be seen in FIGS. 2B, 2C, 3B, 3C, 3D, 4B and 5B. The bed 102 further includes an internal sidewall 110, which is a surface that extends between the internal wall 106 and the external wall 108.

A top wall or surface 112 extends between the internal wall 106 and the external wall 108. The top wall 112 is positioned above the cavity, in the direction V1 and seals the cavity between the internal wall 106 and the external wall 108. The support brackets are positioned in this cavity and coupled to ones of the internal wall, the external wall, and the sidewall of the cavity.

Multiple stake or stake-pocket openings, referred to as first openings 114 are in the top wall 112. A number of first openings 114 on the top wall 112 depends on the size of the bed 102. Shapes and dimensions of the first openings 114 can vary based on a type of the truck 100.

Figure 2A:
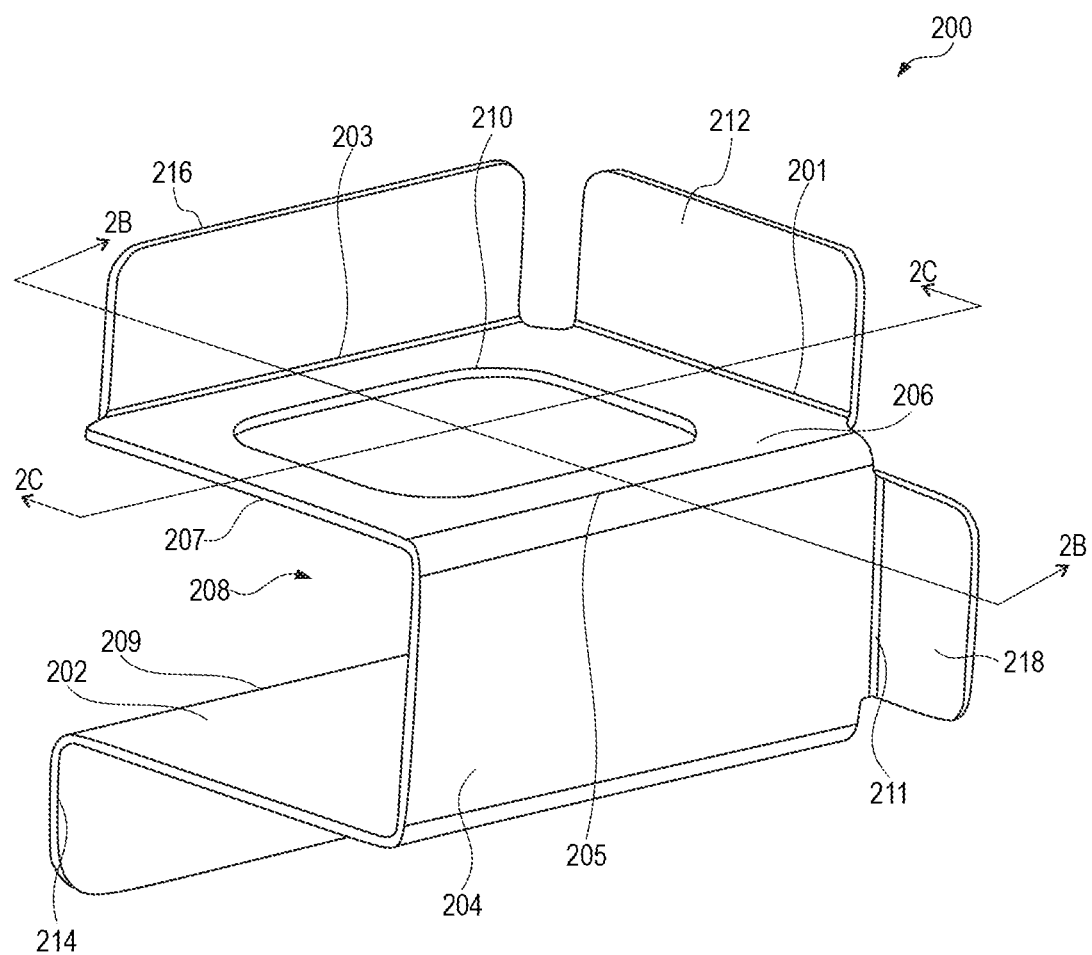
FIG. 2A is a stake support bracket in accordance with an embodiment of the present disclosure.

FIG. 2A is one embodiment of a stake support bracket 200 to be positioned in the cavity between the internal wall 106 and the external wall 108. Specifically, the stake support bracket 200 is positioned within the cavity, beneath the first openings 114 in the top wall 112. The stake support bracket 200 is configured to receive the stake after the stake is inserted into the first opening 114. The stake support bracket 200 includes a first, bottom panel 202 that is a shelf that supports bottom and sides of the stake. A second, side panel 204 extends transverse to the first panel. A third, top panel 206 is coupled to and transverse to the side panel 204. The top panel 206 is substantially parallel to the bottom panel in one embodiment.

The top panel 206 includes an opening 210 that receives the stake and can reduce wobbling or pivoting of the stake. Such reduction in movement of the stake can reduce movement during transportation and can minimize cargo shifts.

The stake support bracket includes a plurality of extensions (212, 214, 216, 218) for coupling the stake support bracket between the internal wall 106, the external wall 108, and the sidewall 110. The stake support bracket is attached, coupled, or otherwise fixed to at least one of the internal wall 106, the external wall 108, or the sidewall 110 by welding, a fastener, or other suitable attachment technique.

The plurality of extensions includes a first extension 212 that extends from a first side 201 of the top panel 206. A third extension 216 extends from a second side 203 of the top panel. The side panel 204 extends from a third side 205 of the top panel. A fourth side 207 does not have an extension in this embodiment. A first side of the bottom panel 202 does not include an extension in this embodiment. A second side 209 of the bottom panel 202 includes a second extension 214 which extends downward away from the bottom panel 202. The side panel 204 includes a fourth extension 218 from a side 211.

Figure 2B:
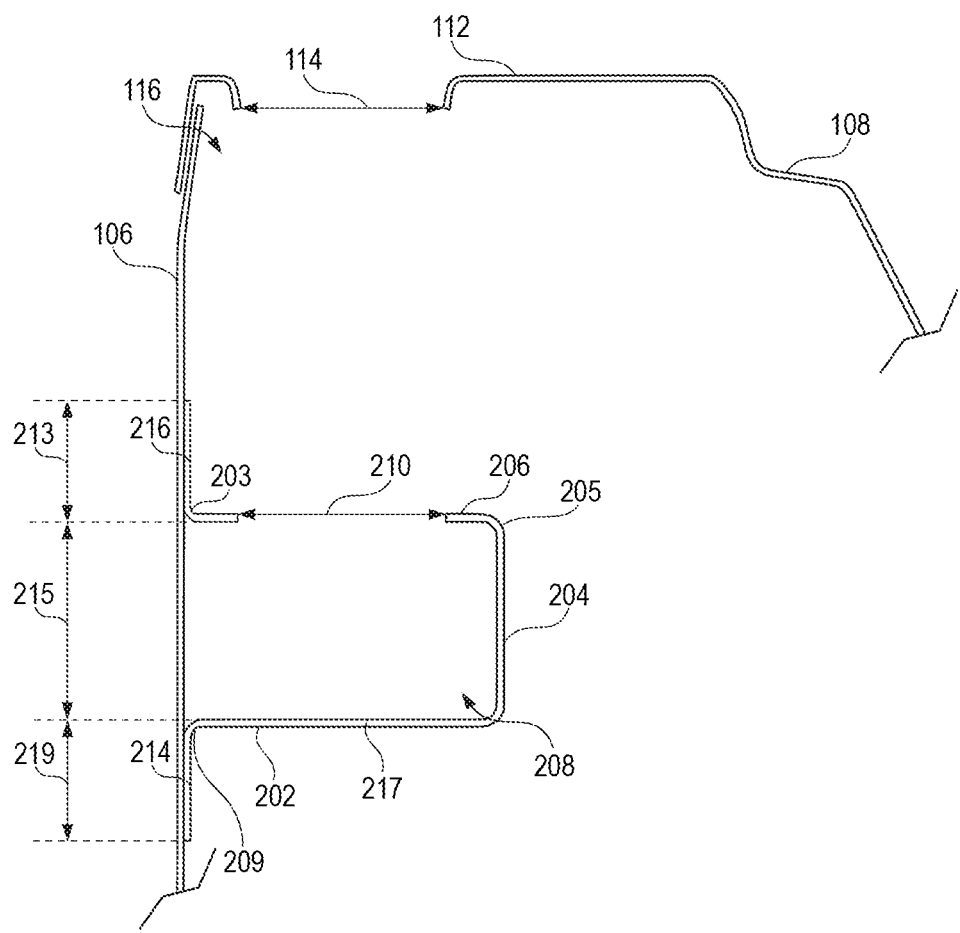
FIG. 2B is a cross-sectional view of the stake support bracket from FIG. 2A, coupled to one or more walls of the truck, along line 2B-2B in accordance with an embodiment of the present disclosure.

FIG. 2B is a cross-sectional view of the stake support bracket 200 of FIG. 2A, along line 2B-2B. The stake support bracket 200 is coupled to the internal wall 106 of the pick-up truck 100 with the second extension 214 and the third extension 216. The first, bottom panel 202 is positioned between the internal wall 106 and the external wall 108, as illustrated in FIG. 2B. The first panel 202 is a solid surface that acts as a ledge for resting one end of a stake to provide support to the stake upon insertion of the stake through the first opening 114.

The second panel 204 is transverse to the first panel 202 and the second panel 204 is spaced from the external wall 108 by a distance. A corner or coupling between the extension 214 and the bottom panel 202 is curved or rounded. The second, side panel 204 is coupled to the bottom panel 202 by a curved or rounded corner. The top panel 206 is coupled to the side panel 204 by a curved or rounded corner. The extension 216 is coupled to the top panel 206 by a curved or rounded corner.

A first dimension 213 from an uppermost edge of the extension 216 to a lowermost edge is less than a second dimension 215 from the lower most edge of the extension 216 to a surface 217 of the bottom panel 202. The second dimension 215 corresponds to the side panel 204. A third dimension 219 from the surface 217 of the bottom panel to a lowermost surface of the extension 214 is less than the second dimension 215. The first dimension 213 and the third dimension 219 may be substantially the same in some embodiments.

The third, top panel 206 is parallel to the first, bottom panel 202, such that space 208 exists between the first panel 202 and the third panel 206 in a location adjacent to the second panel 204. The stake support opening 210, also referred to as a second opening 210 is aligned with the first opening 114 of the top wall 112. In an embodiment, shapes and dimensions of the stake support opening 210 correspond to the shape and dimensions of the stake pocket opening.

The third panel 206, the second panel 204, and the first panel 202 include one or more extensions to couple the stake support bracket 200 to the internal wall 106, the external wall 108, the sidewall 110, or a combination thereof. In an embodiment, the stake support bracket 200 further includes a first top extension, a second top extension, a first middle extension, and a first bottom extension. The first top extension and the second top extension extend from the top panel 206. The first middle extension extends from the first side panel 204. The first bottom extension extends from the bottom panel 202.

Figure 2C:
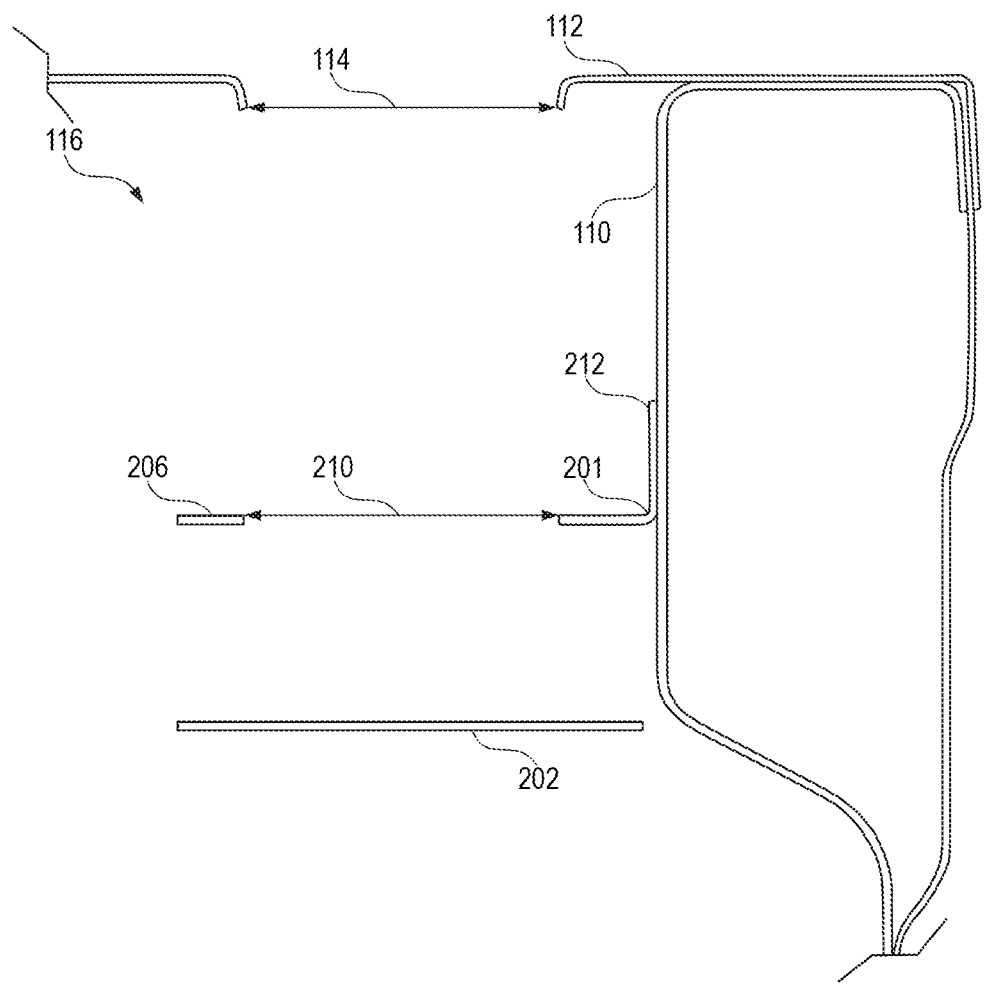
FIG. 2C is a cross-sectional view of the stake support bracket from FIG. 2A, coupled to one or more walls of the truck, along line 2C-2C in accordance with an embodiment of the present disclosure.

FIG. 2C is a cross-sectional view of the stake support bracket 200, illustrated in the FIG. 2A, coupled to the sidewall 110 of the pick-up truck 100 along line 2C-2C. As illustrated in FIGS. 2A and 2C, the first extension 212 is transverse to the third, top panel 206 and extends away from the first panel 202 and the third panel 206 towards the first opening 114. The first extension 212 is coupled to the sidewall 110. In an embodiment, the first extension 212 is coupled to the internal wall 106. Further as illustrated in FIGS. 2A and 2B, the second extension 214 is transverse to the first panel 202 and extends from the first panel 202, in a second direction away from the first opening 114. In some embodiments, the second extension 214 is coupled to the sidewall 110.

As further illustrated in FIGS. 2A and 2B, the third extension 216 is transverse to the third panel 206 and extends away from the third panel 206 in the first direction, towards the first opening 114. The third extension 216 extends transverse to the first extension 212 and extends away from the second extension 214. The third extension 216 is spaced from the second panel 204 by the stake support opening 210. The second extension 214 and the third extension 216 couple to the internal wall 106 and extend in opposite directions.

The fourth extension 218, which extends from the side panel 204, is transverse to the second, side panel 204, and is coupled to the sidewall 110. The fourth extension 218 extends away from the second panel 204 in a third direction that is extending away from the space 208 between the first panel 202 and the third panel 206.

The stake support bracket is an integrally formed metal bracket, which can be made from stamped metal, such as stamped steel, aluminum sheet metal, molded fiber material, etc. The stake support bracket is attached to one or more walls of the pick-up truck 100 without or with a shim.

Figure 3A:
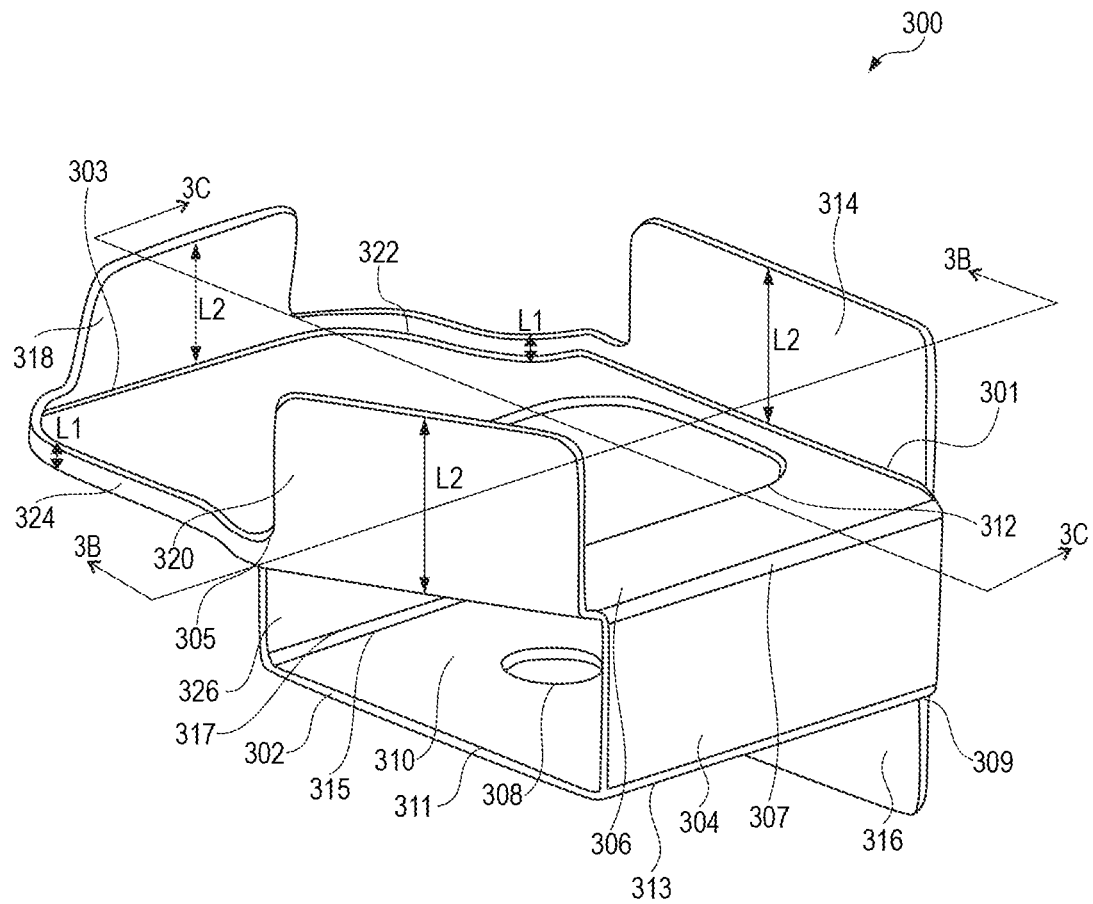
FIG. 3A is another embodiment of a stake support bracket in accordance with the present disclosure
Figure 3B:
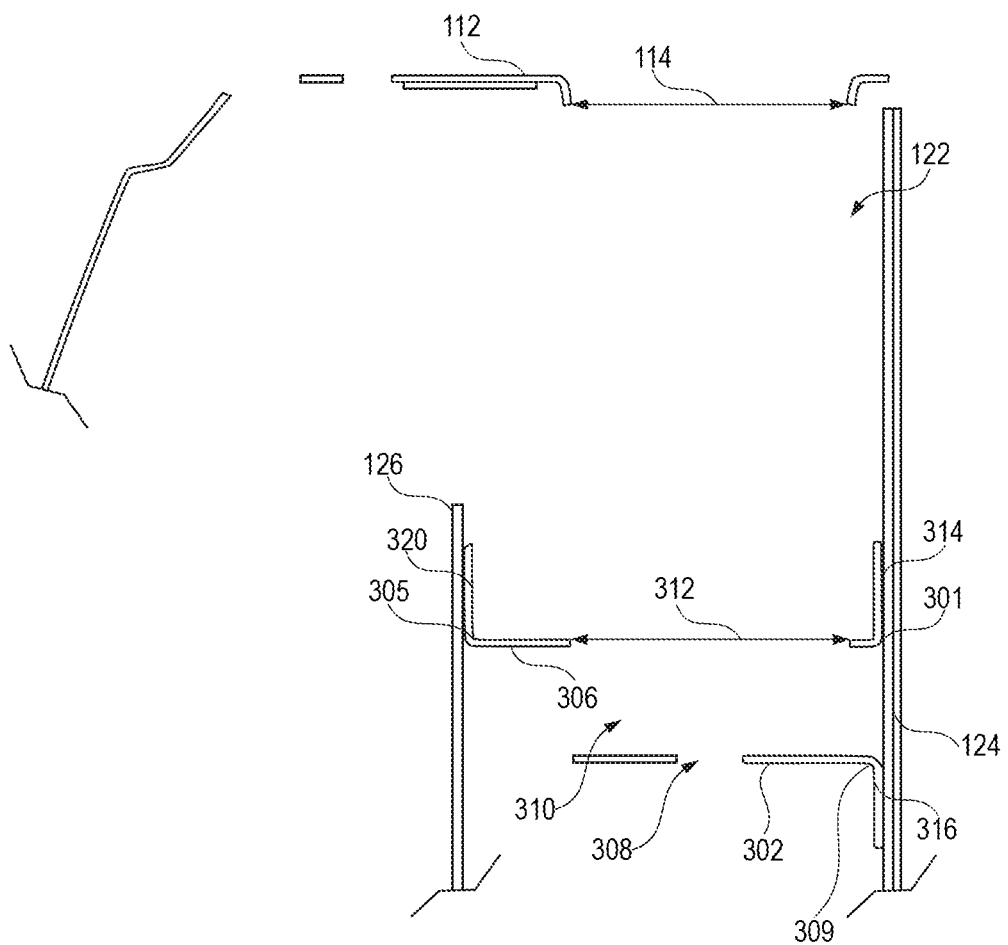
FIG. 3B is a cross-sectional view of the stake support bracket from FIG. 3A, coupled to one or more walls of the truck, along line 3B-3B in accordance with an embodiment of the present disclosure.
Figure 3C:
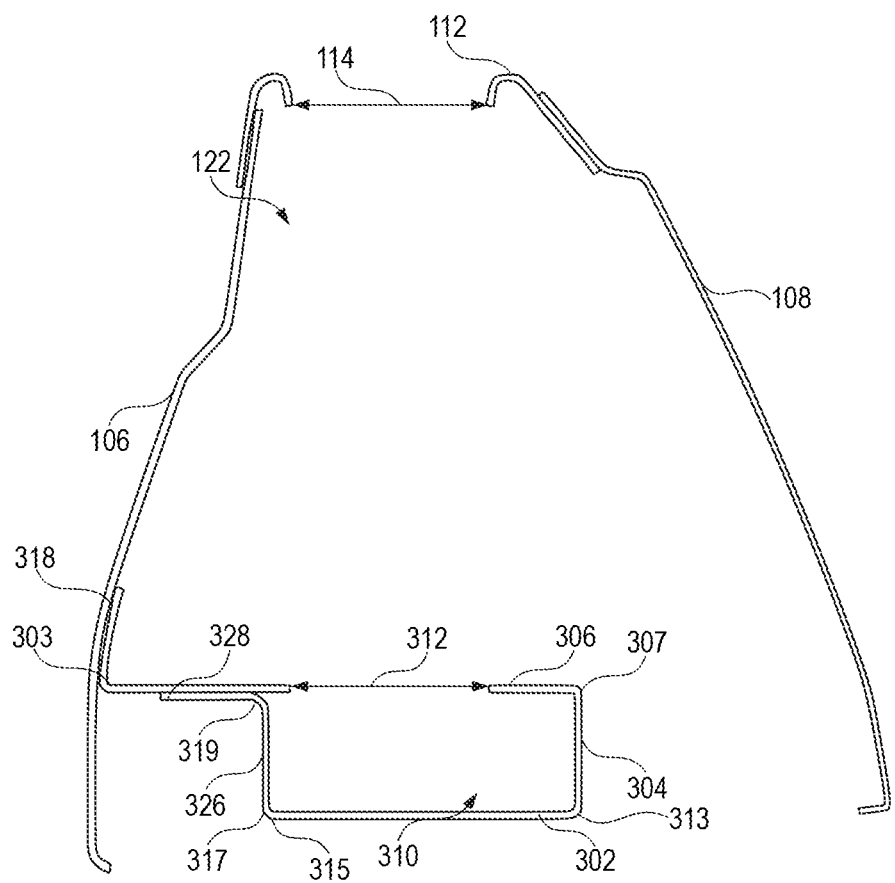
FIG. 3C is a cross-sectional view of the stake support bracket from FIG. 3A, coupled to one or more walls of the truck, along line 3C-3C in accordance with an embodiment of the present disclosure.

FIG. 3A is an alternative embodiment of a stake support bracket 300. FIG. 3B is a cross-sectional view of the stake support bracket 300 along line 3B-3B, including a simplified view of walls of a cavity 122 in which the bracket 300 is coupled. FIG. 3C is cross-sectional view of the stake support bracket 300 along line along line 3C-3C, with the walls of the cavity 122.

The stake support bracket 300 includes a first, lower panel 302, a second, side panel 304, and a third, upper panel 306. The first panel 302 is a smaller panel of the stake support bracket 300 that is positioned between the internal wall 106 and the external wall 108. The first panel 302 acts as a ledge for resting one end of a stake to provide support upon from the first opening 114 and through an opening 312 in the upper panel 306. The first panel 302 includes an opening 308, for example, in a circular shape that is significantly smaller than the opening 312. The opening 312 is configured to receive the stake, so the opening 312 is at least as big as an area of the first opening 114. The area of the opening 308 is smaller than the area of the opening 312.

The third panel 306, also referred to as a top panel 306, is transverse to the second panel 304 and parallel to the first panel 302. The first panel 302 and the third panel 306 are transverse to the second panel 304. The first panel 302, the second panel 304, and a fourth panel 326 are positioned such that a space 310 exists between the first panel 302 and the third panel 306 in a location opposite to the second panel 304.

The third panel 306 has a larger area than an area of the first panel 302. The second panel 304 is transverse to the first panel 302 and the third panel 306. The fourth, side panel 326 is transverse to the first panel 302 and the third panel 306. The fourth, side panel 326 is parallelly positioned and spaced from the second panel 304. The fourth panel 326 is spaced from the second panel 304 by the third opening 308.

The stake support bracket 300 includes a plurality of extensions that extend from the top, bottom, and side panels. A variety of combinations of extensions are envisioned to accommodate different shapes and dimensions within the walls of the bed of the truck.

The stake support bracket 300 includes a plurality of extensions (314, 316, 318, 320) for coupling the stake support bracket 300 between the internal wall 106, the external wall 108, and the sidewalls 124, 126.

The stake support bracket 300 includes a first extension 314 that extends from a first side 301 of the top panel 306, a third extension 318 that extends from a second side 303 of the top panel 306, a fourth extension 320 that extends from a third side 305 of the top panel 306, and the side panel 304 extends from a fourth side 307 of the top panel 306. A second extension 316 extends from a first side 309 of the bottom panel 302 and a second side 311 of the bottom panel 302 does not include any extensions. A third side 313 of the bottom panel 302 receives the side panel 304 that extends from the fourth side 307 of the top panel 306. A first side 317 of the fourth, side panel 326 is coupled to and extends from a fourth side 315 of the bottom panel 302.

In this embodiment, there is a first sidewall 124 and a second sidewall 126 within the cavity 122, as shown in FIG. 3B. The first extension 314 is coupled to the first sidewall 124. The second extension 316 is transverse to the first panel 302 and extends away from the first panel 302 away from the opening 114. The second extension 316 extends in the direction opposite to the direction in which the first extension 314 extends.

The third extension 318 and the fourth extension 320 are transverse to the third, top panel 306 and extends up, toward the opening 114 in the top side 112. The fourth extension 320 is spaced from the first extension 314 by the stake support opening 312 and is substantially parallel to the first extension 314. The fourth extension 320 is coupled to the second sidewall 126.

The third panel 306 includes multiple edges or curved lips as shown in FIG. 3A. A first edge 322 is positioned between the first extension 314 and the third extension 318 along the first side 301 and the second side 303. The first edge 322 has a first dimension L1 in a first direction and the first extension 314 has a second dimension L2 in the first direction. The first dimension L1 is less than the second dimension L2. A second edge 324 is positioned between the third extension 318 and the fourth extension 320 along the second side 303 and the third side 305. The second edge 324 has the first dimension L1 in the first direction and the third extension 318 has the second dimension L2 in the first direction. The dimensions of the first edge 322 and the second edge 324, in an embodiment, are substantially equal. In another embodiment, the dimensions of the first edge 322 and the second edge 324 can be different. The dimensions of the first extension 314, the second extension 316, the third extension 318, and fourth extension 320, in an embodiment, are substantially equal. The dimensions of the first extension 314, the second extension 316, the third extension 318, and fourth extension 320, in another embodiment, may differ from each other.

As illustrated in FIG. 3C, the third extension 318 is spaced from the second panel 304 by the stake support opening 312. The third extension 318 is angled towards the stake support opening 312 to couple to the internal wall 106 based on contour of the internal wall 106. Specifically, the third extension 318 is angled to a plane that is perpendicular to the third plane 306. In an embodiment, the third extension 318 is coupled to the first sidewall 124 or the second sidewall 126. In another embodiment, the third extension 318 is perpendicular to the third panel 306.

The stake support bracket 300 further includes a fifth extension 328 that is transverse to the fourth panel 326 and is adjacent to a portion of the third, top panel 306. The fifth extension 328 extends from a second side 319 of the fourth, side panel 326 towards the internal wall 106 and away from the second panel 304. This fifth extension 328 may be welded to the top panel or may be adjacent to the top panel.

In another example, the first top extension is coupled to the internal wall 106, the second top extension is coupled to the second sidewall 126, the third top extension is coupled to the external wall 108, and the first bottom extension is coupled to the internal wall 106. In yet another example, the first top extension is coupled to the second sidewall 126, the second top extension is coupled to the external wall 108, the third top extension is coupled to the first sidewall 124, and the first bottom extension is coupled to the second sidewall 126.

Figure 3D:
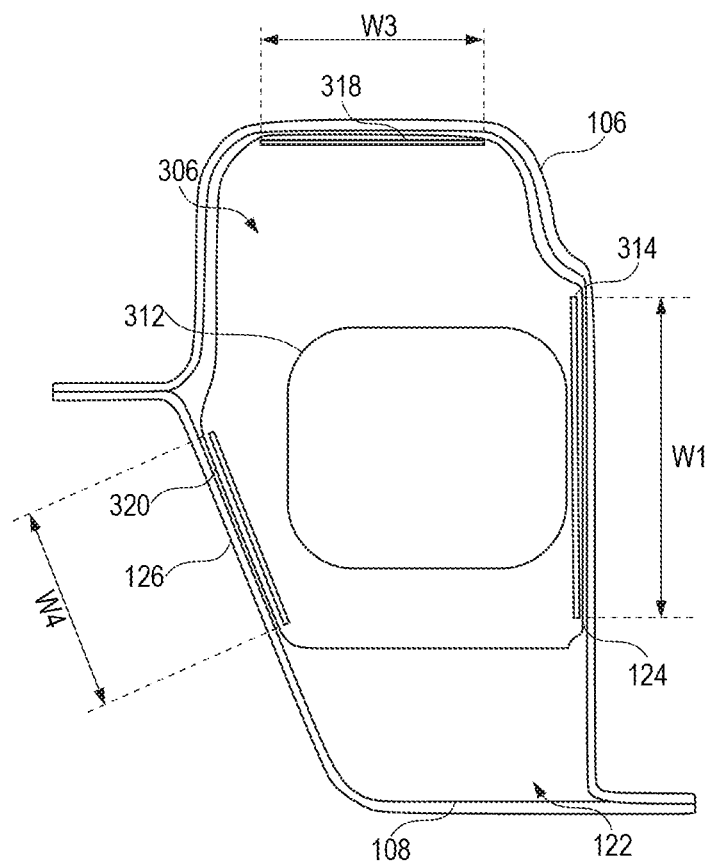
FIG. 3D is a top view of the stake support bracket from FIG. 3A in accordance with an embodiment of the present disclosure.

FIG. 3D is a top view of the stake support bracket 300, illustrated in the FIGS. 3A, 3B, and 3C. The stake support bracket 300 is positioned in the cavity 122 between the internal wall 106 and the external wall 108, and in between the first sidewall 124 and the second sidewall 126. The stake support bracket 300, as illustrated in the FIGS. 3B and 3C, is attached to at least three walls, that is, the third extension 318 is coupled to the internal wall 106, the first extension 314 is coupled to the first sidewall 124 and the fourth extension 320 is coupled to the second sidewall 126 opposite to the first sidewall 124 coupled to the first extension 314. The stake support bracket 300, coupled to the three walls, acts as a torsion brace to prevent the stake from moving toward neighboring stakes. The first extension 314, coupled to the first sidewall 124, has a width of W1, the third extension 318, coupled to the internal wall 106, has a width of W3, and the fourth extension 320, coupled to the second sidewall 126, has a width of W4. The width W1 is greater than the widths W3 and W4. In an embodiment, the widths W1, W3, W4 are substantially equal. The second extension 316 has a width (not shown) that is equal to width W1. In an embodiment, the width of the second extension 316 is less than the width W1.

Figure 4A:
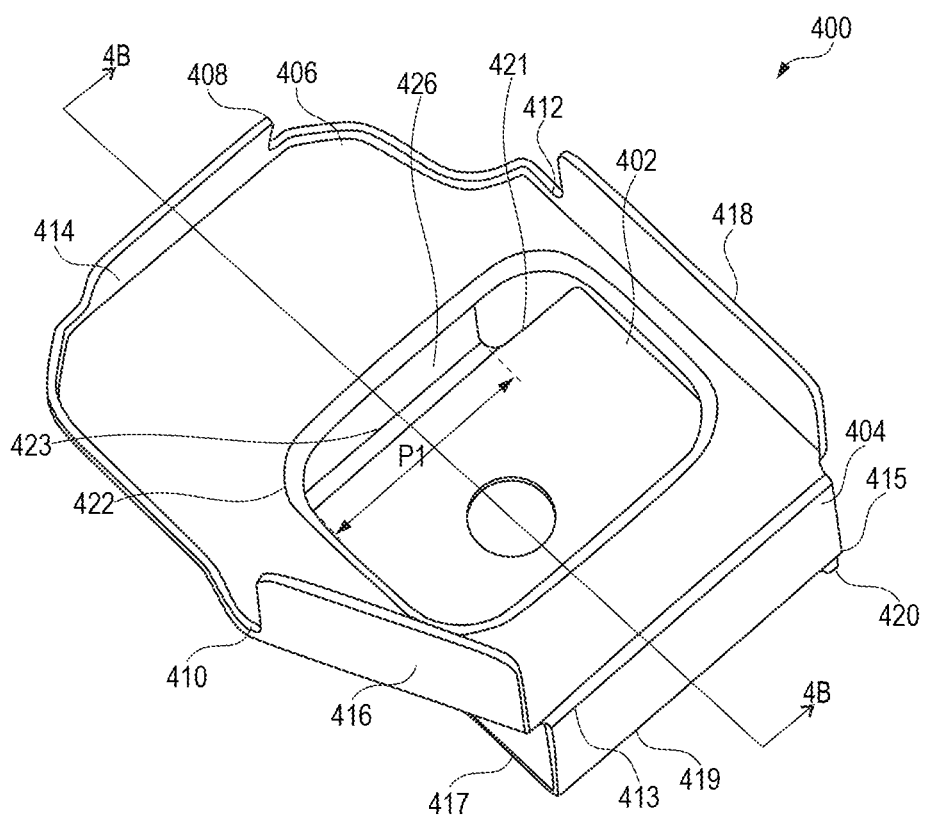
FIG. 4A is another embodiment of a stake support bracket in accordance with the present disclosure.
Figure 4B:
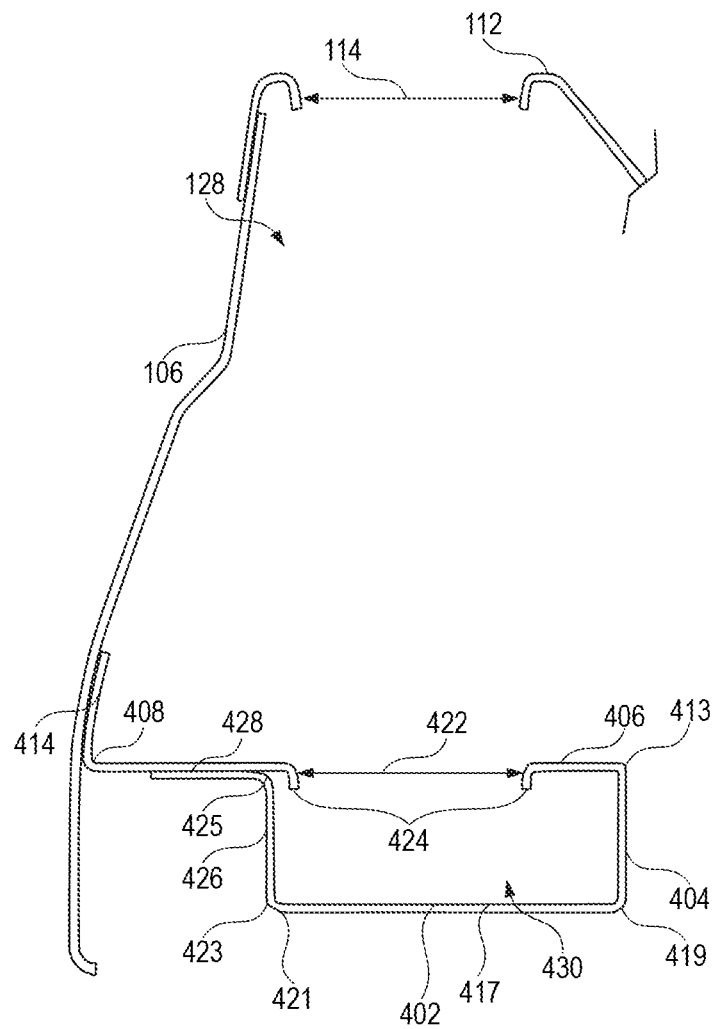
FIG. 4B is a cross-sectional view of the stake support bracket from FIG. 4A, coupled to one or more walls of the truck, along line 4B-4B, in accordance with an embodiment of the present disclosure.

FIG. 4A is another embodiment of the stake support bracket 400. FIG. 4B is a cross-sectional view of the stake support bracket 400, illustrated in the FIG. 4A, coupled to the internal wall 106 along line 4B-4B. The stake support bracket 400 includes a first, bottom panel 402, a second, side panel 404, a third, top panel 406, and a fourth, side panel 426. The first panel 402, the second panel 404, and the fourth panel 426 are positioned such that a space 430 exists between the first panel 402 and the third panel 406 in a location opposite to the second panel 404, as illustrated in the FIG. 4B.

The stake support bracket 400 includes a plurality of extensions (414, 416, 418, 420) for coupling the stake support bracket 400 in a cavity 128 between the internal wall 106, the external wall 108, and sidewalls.

The plurality of extensions, as illustrated in FIG. 4A, include a first extension 414 that extends from a first side 408 of the third panel 406, a second extension 416 that extends from a second side 410 of the third panel 406, and a fourth extension 418 that extends from a third side 412 that is transverse to the first side 408 of the third panel 406. The second panel 404 extends from a fourth side 413 of the third panel 406. The first panel 402 includes a third extension 420 that extends from a first side 415. A second side 417 of the first panel 402 does not include extensions. A third side 419 of the first panel 402 receives the second panel 404 that extends from the fourth side 413 of the third panel 406.

A first side 423 of the fourth, side panel 426 is coupled to and extends from a partial portion P1 of the fourth side 421 of the first panel 402 towards the third panel 406, as illustrated in the FIG. 4A. The first side 423 of the fourth panel 426 is shorter than the fourth side 421 of the first panel 402. In an embodiment, the fourth panel 426 extends from a complete portion of length of the first panel 402.

Reference is now made to FIG. 4B, the first extension 414 of the third panel 406 is coupled to the interior wall 106, angled to a plane that is substantially perpendicular to the third panel 406 and towards the second opening 422. Specifically, the first extension 414 is angled to couple to the internal wall 106 based on contour of the internal wall 106. The second extension 416 of the third panel 406 is coupled to a first sidewall (not shown) and the fourth extension 418 is coupled to a second sidewall (not shown). The third extension 420 of the third panel 406 is coupled to the second sidewall. The stake support bracket 400 includes a fourth panel 426 positioned between the third panel 406 and the first panel 402. A fifth extension 428 is transverse to the fourth panel 426 and is adjacent to a portion of the third panel 406. The fifth extension 428 extends from a second side 425 of the fourth, side panel 426 towards the internal wall 106 and away from the second panel 404.

The third panel 406 of the stake support bracket 400 includes a second opening 422 aligned with the first opening 114 of the top wall 112 for receiving the stake. The second opening 422 is a punched hole that includes an internal edge 424, which is a token flange, at the periphery of the second opening 422. The internal edge 424 from the stake support bracket 400 opens towards or otherwise faces the first panel 402. The internal edge 424 is folded to reduce scraping of the stake and to assist the stake while the stake moves from the third panel 406 to the first panel 402. In an embodiment, the first opening 114 includes an internally folded edge to reduce scraping of the stake while the stake moves from the first opening 114 towards the second opening 422 of the stake support bracket 400. In an embodiment, the stake support bracket 200 and the stake support bracket 300 include an internal edge at periphery of the second opening 210 and periphery of the second opening 312, respectively.

Figure 5A:
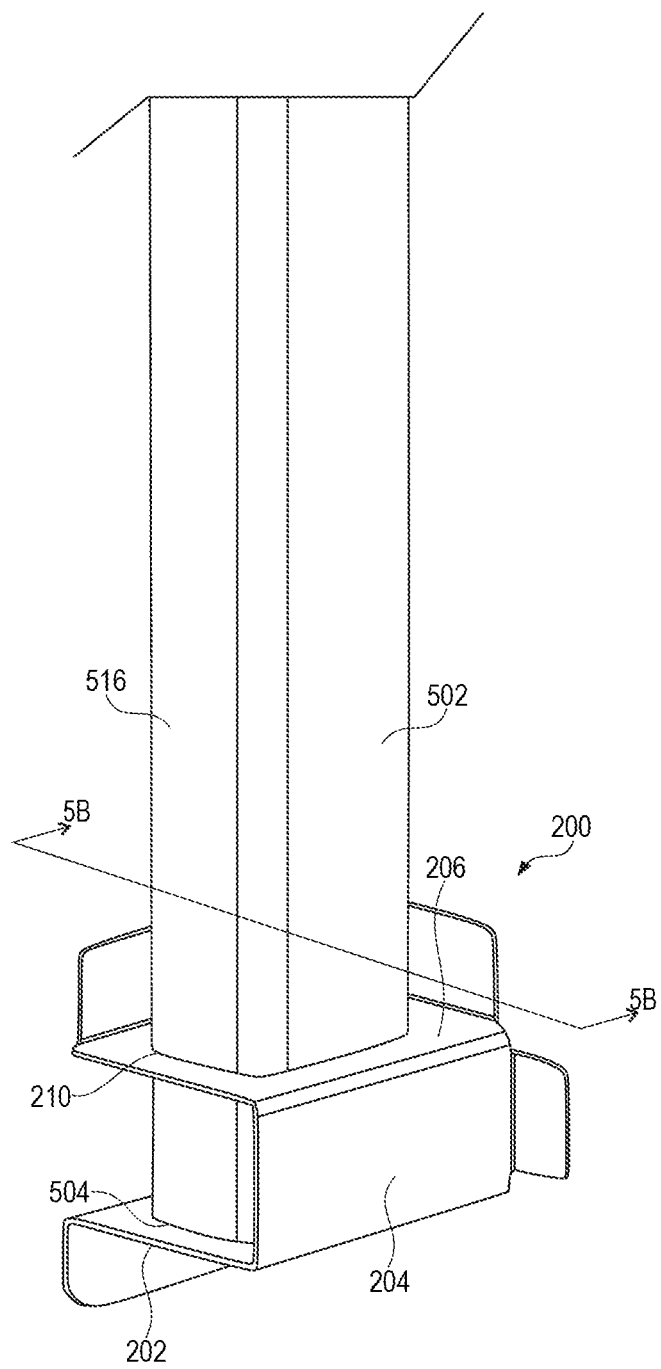
FIG. 5A is the stake support bracket of FIG. 2A, with a stake in the stake support bracket in accordance with an embodiment of the present disclosure.
Figure 5B:
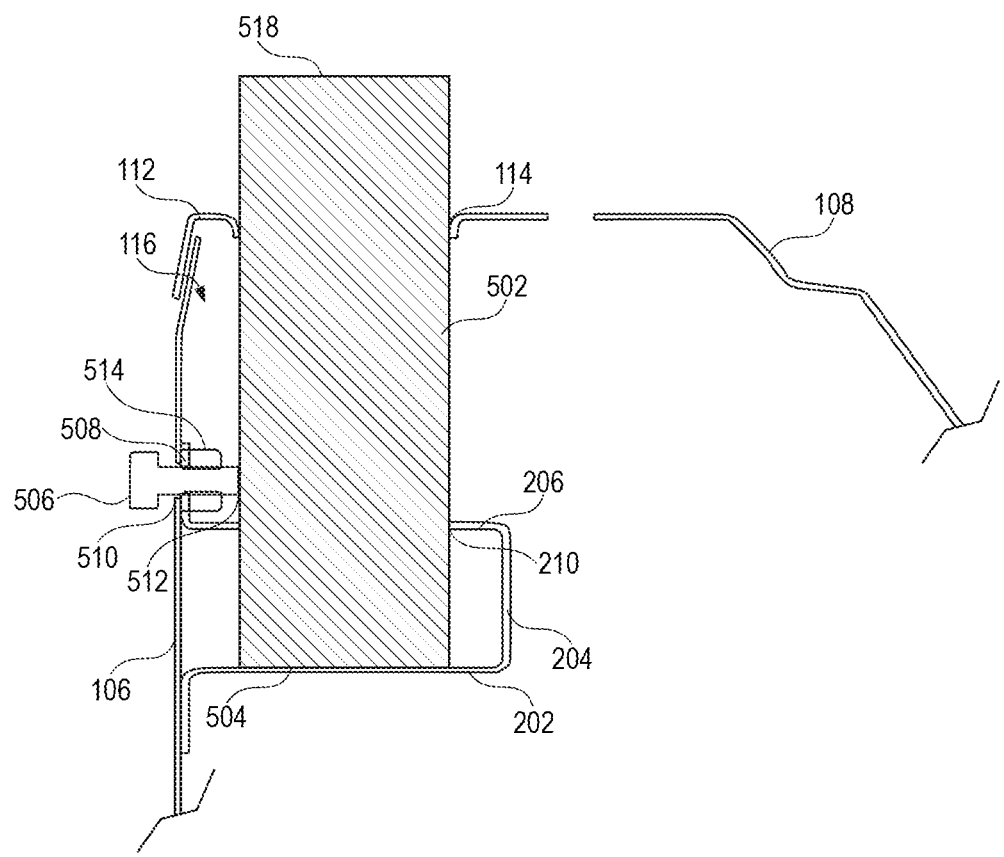
FIG. 5B is a cross-sectional view of the stake support bracket and the stake of FIG. 5A, coupled to one or more walls of the truck and a fastener through an extension of the stake support bracket, along line 5B-5B.

FIG. 5A is the stake support bracket 200, illustrated in FIG. 2, with a stake 502 affixed to the stake support bracket 200. FIG. 5B is a cross-sectional view of the stake support bracket 200 with the stake 502, along line 5B-5B, including a simplified view of walls of the cavity 116 in which the bracket 200 is coupled. The stake 502 is a post that includes a top end 518, a bottom end or a bottom 504, and side 516 that extend laterally between the top end 518 and the bottom end 504. The stake 502 includes multiple sides 516 and the number of sides 516 may depend on the shape of the stake 502.

As illustrated in FIG. 5B, the first opening 114 on the top wall 112 receives the stake 502 and directs the stake 502 towards the stake support bracket 200. The second opening 210 then receives the stake 502 and allows the bottom 504 of the stake 502 to rest on the first panel 202. Accordingly, the stake support bracket 200 supports the bottom 504 of the stake 502 and the second opening 210 supports the sides 516 of the stake 502. The stake support bracket 200 allows the stake 502 to be erected such that the stake 502 is substantially perpendicular to the bed 102 of the pick-up truck 100.

In an embodiment, the stake 502 positioned in the stake support bracket 200 is held firmly by introducing the fastener 506 through the internal wall 106, the external wall 108, or a sidewall 110. The fastener 506 is positioned to contact the stake 502 to impede movement of the stake 502 during movement of the pick-up truck 100. The internal wall 106 includes one or more holes 510, also referred as clearance holes, on an area adjacent to the first opening 114 on the top wall 112. The stake support bracket 200 is aligned and coupled in the cavity 116 beneath the first opening 114. The stake support bracket 200 includes at least one extension with a hole 508 and positioned such that the hole 510 on the internal wall 106 and the hole 508 on the extension of the stake support bracket 200 coincide.

In use, the fastener 506 may push against the left-most wall of the stake as shown in FIG. 5B. As the fastener is tightened, a space may be formed between the left-most wall of the stake and the left-most edge of the opening 210 in FIG. 5B. A right-most wall of the stake will be abutting or in direct contact with the right-most edge of the opening 210. Said differently, the opening 210 will be larger than the stake, such that there is a space between the edge of the opening and at least one wall of the stake.

The bottom 504 of the stake 502, upon insertion, rests on the first panel 202 and a clearance exists between the stake 502 and the first opening 114. The fastener 506, for example, a screw, is inserted and moved inside a cavity 116 through the hole 510 of the internal wall 106 and the hole 508 of the extension until a tip 512 of the fastener 506 couples with the stake 502. The fastener 506 pushes against the stake 502 in the stake support bracket 200 for positioning the stake 502 firmly to reduce pivoting or wobbling of the stake 502 irrespective of the clearance between the stake 502 and the first opening 114 or the clearance between the stake 502 and the second opening 210. A nut 514 is positioned on the hole 512 of the extension towards the stake 502 for facilitating usage of the screw 506 to secure the stake 502. In an alternate embodiment, the stake support bracket 200 can receive and support the stake 502 of standard and non-standard sizes or dimensions. The stake support bracket 200, in an example, also supports racks and toolboxes.

In an embodiment, the external wall 108 includes one or more holes in an area adjacent to the first opening 114 to position the stake 502 in the bracket 200 or to couple the bracket 200 with the external wall 108 using one or more fasteners 506. To couple the bracket 200 with the external wall 108, the fastener 506 is inserted through the hole 508 in the extension that coincides with the hole on the external wall 108.

In another embodiment, the sidewall 110 includes one or more holes to position the stake 502 in the bracket 200 or to couple the bracket 200 with the sidewall 110 using one or more fasteners 506. To couple the bracket 200 with the sidewall 110, the fastener 506 is inserted through the hole 508 in the extension that coincides with the hole on the sidewall 110. In an embodiment, the stake 502 includes a hole that coincides with the hole 508 in the extension and/or the hole in one of the internal wall 106, the hole in the external wall 108, or the sidewall 110 for receiving the screw 506. The hole of the stake 502 receives the screw 506 through one or more holes disclosed above to lock and secure the stake 502.

In another embodiment, one or more extensions of the bracket 300 or the bracket 400, as disclosed in FIGS. 3A and 4A respectively, include holes for coupling the bracket 300 or the bracket 400 to one or more walls of the pick-up truck 100. The holes on the extensions of the bracket 300 or the bracket 400 can receive the fastener 506 to position and secure the stake 502 inside the bracket 300 or the bracket 400 similar to as shown in FIG. 5B.

The various embodiments described above can be combined to provide further embodiments. All of the U.S. patents, U.S. patent application publications, U.S. patent applications, foreign patents, foreign patent applications, and non-patent publications referred to in this specification and/or listed in the Application Data Sheet are incorporated herein by reference, in their entirety. Aspects of the embodiments can be modified, if necessary, to employ concepts of the various patents, applications, and publications to provide yet further embodiments.

These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

The invention claimed is:

1. A device, comprising:
   a stake support bracket that includes:
   a first panel;
   a second panel transverse to the first panel;
   a third panel transverse to the second panel, the third panel including a stake support opening;
   a first extension transverse to the third panel and extending away from the first panel; and
   a second extension transverse to the first panel and extending away from the third panel,
       wherein the third panel has a larger area than the first panel, the stake support bracket includes a third extension transverse to the third panel, and extending away from the first panel, the stake support opening being between the third extension and the second panel.

2. The device of claim 1 wherein the first panel includes an opening that is less than the stake support opening.

3. The device of claim 1 wherein the stake support bracket further includes:
   a third extension transverse to the third panel and extending away from the first panel, the third extension extends transverse to the first extension.

4. The device of claim 3 wherein the stake support bracket further includes a fourth extension transverse to the second panel.

5. The device of claim 4 wherein the stake support bracket includes a space between the first and third panel in a location opposite to the second panel.

6. The device of claim 1 wherein the stake support bracket includes a fourth extension transverse to the third panel and extending away from the first panel.

7. The device of claim 1 wherein the third panel includes an edge that extends between the third extension and the first extension, the edge having a first dimension in a first direction, the first extension having a second dimension in the first direction, the first dimension being less than the second dimension.

8. The device of claim 1 wherein the stake support bracket includes a fourth panel that is opposite to the second panel and is transverse to the first panel.

9. The device of claim 8 wherein the stake support bracket includes a fifth extension that is transverse to the fourth panel and is adjacent to a portion of the third panel.

10. The device of claim 1 wherein the third panel includes an internal edge that extends from the stake support opening toward the first panel.

11. A vehicle, comprising:
    a pick-up bed that includes a plurality of sides, each side including:
    an internal wall, an external wall, and a sidewall between the internal and external wall;
    a support bracket positioned within one of the plurality of sides of the pick-up bed, the support bracket including:
    a first panel that is between the internal and external wall of the side of the pick-up bed;
    a second panel transverse to the first panel;
    a third panel transverse to the second panel, the third panel including a stake support opening;
    a first extension transverse to the third panel and coupled to the sidewall; and
    a second extension transverse to the first panel and coupled to the internal wall.

12. The vehicle of claim 11 wherein the support bracket includes a third extension that is coupled to the internal wall and a fourth extension is coupled to the sidewall.

13. The vehicle of claim 11 wherein the third panel has a larger area than the first panel;
    a third extension that extends from the third panel, the third extension is spaced from the second panel by the stake support opening; and
    a fourth extension that extends from the third panel.

14. The vehicle of claim 13 wherein the fourth extension is coupled to the sidewall.

15. The vehicle of claim 11 wherein the second panel is spaced from the external wall by a distance.

16. The vehicle of claim 11 wherein the support bracket is an integrally formed metal bracket.

17. A vehicle, comprising:
    a bed;
    an interior wall of the bed;
    an exterior wall of the bed;
    a sidewall that extends between the interior wall and the exterior wall;
    a top wall that extends between the interior wall and the exterior wall;
    a first opening in the top wall;
    a support bracket between the interior wall and the exterior wall, the support bracket including:
    a top panel that includes a second opening that is aligned with the first opening;
    a bottom panel that is spaced from the top panel;
    a first side panel that is coupled between the top and bottom panel;
    a first extension coupled to the interior wall; and
    a second extension coupled to the sidewall.

18. The vehicle of claim 17 wherein the first extension extends transverse from the top panel and the second extension extends transverse from the bottom panel.

19. The vehicle of claim 17 wherein the bottom panel includes a solid surface.

20. The vehicle of claim 17 wherein the support bracket further includes:
    a third extension that extends transverse to the bottom panel and is coupled to the sidewall;
    a fourth extension that extends transverse to the top panel, the first extension extends from a first side of the top panel, the second extension extends from a second side of the top panel, the fourth extension extends from a third side of the top panel that is transverse to the first side.

* * * * *